United States Patent
Fujii et al.

(10) Patent No.: US 10,436,364 B2
(45) Date of Patent: Oct. 8, 2019

(54) STRUCTURE OF RESIN-MADE PIPE JOINT

(71) Applicant: Nippon Pillar Packing Co., Ltd., Osaka-shi (JP)

(72) Inventors: Makoto Fujii, Osaka (JP); Masaki Miyamoto, Osaka (JP); Tatsuya Fujii, Osaka (JP); Toshihide Iida, Osaka (JP); Tomoyuki Koike, Osaka (JP); Shintaro Makihata, Osaka (JP)

(73) Assignee: Nippon Pillar Packing Co., Ltd., Osaka-shi (JP)

( * ) Notice: Subject to any disclaimer, the term of this patent is extended or adjusted under 35 U.S.C. 154(b) by 265 days.

(21) Appl. No.: 15/509,897

(22) PCT Filed: Jan. 20, 2016

(86) PCT No.: PCT/JP2016/051503
§ 371 (c)(1),
(2) Date: Mar. 9, 2017

(87) PCT Pub. No.: WO2016/129341
PCT Pub. Date: Aug. 18, 2016

(65) Prior Publication Data
US 2017/0299097 A1    Oct. 19, 2017

(30) Foreign Application Priority Data
Feb. 13, 2015   (JP) .................. 2015-026008

(51) Int. Cl.
*F16L 33/22*     (2006.01)
*F16L 47/04*     (2006.01)

(52) U.S. Cl.
CPC ............. *F16L 33/22* (2013.01); *F16L 33/223* (2013.01); *F16L 47/04* (2013.01)

(58) Field of Classification Search
CPC .......... F16L 33/22; F16L 33/223; F16L 47/04
See application file for complete search history.

(56) References Cited

U.S. PATENT DOCUMENTS 6,089,621 A * 7/2000 Nishio .................. F16L 19/041
                                                    285/331
6,193,239 B1 * 2/2001 Fukano ................ F16L 19/028
                                                    277/615
(Continued)

FOREIGN PATENT DOCUMENTS

EP     0 872 678 A1    10/1998
EP     1 046 853 A1    10/2000
(Continued)

OTHER PUBLICATIONS

Extended European Search Report dated Jul. 24, 2018 in European Patent Application No. 16748986.3, 7 pages.
(Continued)

*Primary Examiner* — James M Hewitt, II
(74) *Attorney, Agent, or Firm* — Oblon, McClelland, Maier & Neustadt, L.L.P.

(57) ABSTRACT

A structure of a resin-made pipe joint includes a joint body having a cylindrical shape, a sleeve having a cylindrical press-inserting portion which is press-insertable into the joint body and a cylindrical coupling portion which is press-insertable into a tube, and a fastening member for fixing the tube which is in a state where the coupling portion is press-inserted, to the joint body through the sleeve. The sleeve contains a sealing surface in an outer circumferential surface of the press-inserting portion, the sealing surface being closely contactable with an inner circumferential surface of the joint body, and comprises a non-contacting surface between the press-inserting portion and the coupling portion, the non-contacting surface forming a space with respect to the inner circumferential surface of the joint body, when the sealing surface is closely contacted with the inner circumferential surface of the joint body.

6 Claims, 7 Drawing Sheets

(56) References Cited

U.S. PATENT DOCUMENTS

2006/0157975 A1* 7/2006 Fujii .................. F16L 19/028
285/247
2016/0116096 A1   4/2016 Fujii et al.
2017/0307118 A1  10/2017 Fujii et al.

FOREIGN PATENT DOCUMENTS

| JP | 10-54489 A | 2/1998 |
|----|----|----|
| JP | 2005-163938 A | 6/2005 |
| JP | 2013-100875 A | 5/2013 |
| WO | 00/28254 A1 | 5/2000 |
| WO | WO 2014/181686 A1 | 11/2014 |
| WO | WO 2016/117581 A1 | 7/2016 |

OTHER PUBLICATIONS

International Search Report dated Mar. 22, 2016 in PCT/JP2016/051503 filed Jan. 20, 2016.
South Korean Office Action dated Nov. 8, 2018 in Patent Application No. 10-2017-7006466, 11 pages (with English translation).

* cited by examiner

STRUCTURE OF RESIN-MADE PIPE JOINT

TECHNICAL FIELD

The present invention relates to a structure of a resin-made pipe joint.

BACKGROUND ART

As a structure of a resin-made pipe joint which is used for a tube for a fluid (for example, high purity liquid, ultrapure water, or chemical liquid) to be handled in a production process of various technical fields such as production of semiconductor devices, production of medical equipment and medicines, food processing, and chemical industry, for example, a structure of a resin-made pipe joint disclosed in Patent Literature 1 is known.

A structure of a resin-made pipe joint of this kind comprises a joint body, an inner ring (sleeve), and a press ring (fastening member). The joint body exhibits a cylindrical shape. The inner ring has a cylindrical press-inserting portion which can be press-inserted into the joint body, and a cylindrical coupling portion which can be press-inserted into a tube.

The press ring is configured so that the tube in a state where the coupling portion is press-inserted can be fixed to the joint body through the sleeve. Namely, the press ring is configured so that the state where the tube is connected to the joint body through the sleeve can be held.

In such a resin-made pipe joint, when the tube is connected to the joint body, a sealing portion which seals between the joint body and the press-inserting portion of the sleeve is formed. During a process of forming the sealing portion, in addition to the inner circumferential surface of the joint body, the outer circumferential surface of the press-inserting portion of the sleeve which is in close contact with the inner circumferential surface functions as an annular sealing surface.

The sleeve is produced by using a predetermined resin and molds. The molds comprise a gate port for pouring the resin (molten resin) which melts during production, into a cavity formed by the molds. In the molds, the gate port is placed in a portion where the outer circumferential surface (sealing surface) of the press-inserting portion of the produced sleeve is to be molded, and therefore a gate residue is generated on the sealing surface.

When the molten resin is poured into the cavity through the gate port, moreover, the molten resin flows so as to circumferentially spread in order to mold the sleeve, and then the sealing surface is formed. After the pouring of the molten resin is completed, therefore, a weld line is easily generated on the sealing surface.

In the case where a weld line or/and a gate residue is generated on the sealing surface, when the sleeve is used as it is, furthermore, the sealing property of the sealing portion is lowered. Therefore, there arises an inconvenience that a polishing step for removing a weld line or/and a gate residue must be disposed in a work of producing the sleeve.

PRIOR ART LITERATURE

Patent Literature

Patent Literature 1: Japanese Patent Application Laid-Open No. 10-054489

SUMMARY OF THE INVENTION

Problems to be Solved by the Invention

The invention has been conducted in view of the above-discussed circumstances. It is an object of the invention to provide a structure of a resin-made pipe joint in which, in order to form a sealing portion which seals between a joint body and a sleeve, a press-inserting portion of the sleeve is press-inserted into the joint body, and which can prevent the property of sealing between the joint body and the press-inserting portion of the sleeve from being lowered due to the production accuracy of the sleeve without causing a work of producing the sleeve to become cumbersome.

Means for Solving the Problems

A structure of a resin-made pipe joint in one mode of the invention is a structure of a resin-made pipe joint which comprises:

a joint body having a cylindrical shape:

a sleeve having a cylindrical press-inserting portion which is press-insertable into the joint body, and a cylindrical coupling portion which is press-insertable into a tube; and a fastening member for fixing the tube which is in a state where the coupling portion is press-inserted, to the joint body through the sleeve, wherein the sleeve contains a sealing surface in an outer circumferential surface of the press-inserting portion, the sealing surface being closely contactable with an inner circumferential surface of the joint body, and comprises a non-contacting surface between the press-inserting portion and the coupling portion, the non-contacting surface forming a space with respect to the inner circumferential surface of the joint body, when the sealing surface is closely contacted with the inner circumferential surface of the joint body.

According to the configuration, the tube can be coupled to the structure of a resin-made pipe joint by press-inserting the press-inserting portion of the sleeve into the joint body, and press-inserting the coupling portion into the tube. Then, the sealing property of a sealing portion which seals between the joint body and the sleeve can be prevented from being lowered due to the production accuracy of the sleeve, without causing troubles such as polishing of the sealing surface of the press-inserting portion during production of the sleeve.

Namely, the sleeve is produced by using a predetermined resin and molds. In production of the sleeve, a gate port of the molds is placed in one place of an area for molding the non-contacting surface in a cavity formed by the molds, and a molten resin is poured into the cavity through the gate port. Therefore, the gate port is not placed in a portion where the sealing surface is to be molded, and hence a gate residue is not generated on the sealing surface.

When the molten resin is poured into the cavity through the gate port, the resin basically undergoes a process in which the resin flows in the circumferential direction to form the non-contacting surface, and then flows in the axial direction to form the sealing surface and the like. Therefore, a weld line is hardly generated on the molded sealing surface.

After the pouring of the molten resin is completed, moreover, a weld line is hardly generated on the sealing surface, and a gate residue is not generated on the sealing surface. During the work of producing the sleeve, therefore, it is not required to perform a step of polishing the sealing surface in which the sealing property of the sealing portion is considered. In the production of the sleeve, as a result, the quality can be stabilized, and the production cost can be reduced.

According to another mode of the invention,
the sleeve has
a step portion for locating the non-contacting surface radially inside an outer circumferential surface of the press-inserting portion, between the outer circumferential surface of the press-inserting portion and the non-contacting surface.

According to a further mode of the invention,
the joint body has:
a body cylinder portion in which a flow path for a fluid is formed, the flow path being communicatable with an interior of the tube through the sleeve;
an outer cylinder portion which is coaxially projected from the body cylinder portion in an axial direction of the body cylinder portion so as to be screwable with the fastening member; and
an inner cylinder portion which is placed radially inside the outer cylinder portion, and which is coaxially projected from the body cylinder portion in a same direction as the outer cylinder portion so as to locate a projection end on a side of the body cylinder portion with respect to a projection end of the outer cylinder portion, and
is configured so that a groove portion which opens in one axial direction is formed while being surrounded by the body cylinder portion, the outer cylinder portion, and the inner cylinder portion, and
the sleeve has:
a cylindrical inserting portion which contains the non-contacting surface in the outer circumferential surface, which, between the press-inserting portion and the coupling portion, causes them to be coaxially projected, and which is inserted into the outer cylinder portion; and
a cylindrical restricting portion which is placed radially inside the press-inserting portion, and which is projected from the inserting portion so as to locate a projection end on a side of the inserting portion with respect to the projection end of the press-inserting portion,
the press-inserting portion being press-inserted into the groove portion, the restricting portion being configured to, during a process of press-inserting the press-inserting portion into the groove portion, be located radially inside the inner cylinder portion to restrict deformational movement of the inner cylinder portion toward the radially inner side, the inner cylinder portion being pushed by the press-inserting portion.

Effects of the Invention

According to the invention, it is possible to provide a structure of a resin-made pipe joint in which, in order to form a sealing portion which seals between a joint body and a sleeve, a press-inserting portion of the sleeve is press-inserted into the joint body, and which can prevent the property of sealing between the joint body and the press-inserting portion of the sleeve from being lowered due to the production accuracy of the sleeve without causing a work of producing the sleeve to become cumbersome.

The structure of a resin-made pipe joint of the invention may be used while, in an apparatus for producing semiconductor devices, liquid crystal devices, organic EL devices, or the like, being disposed between a tube and another tube in order to connect the tubes to each other, or disposed at a tube connecting position of a fluid apparatus such as a valve or a pump in order to connect a tube to the fluid apparatus.

First, the configuration of a structure 1 of a resin-made pipe joint of an embodiment of the invention will be schematically described with reference to the drawings.

Figure 1:
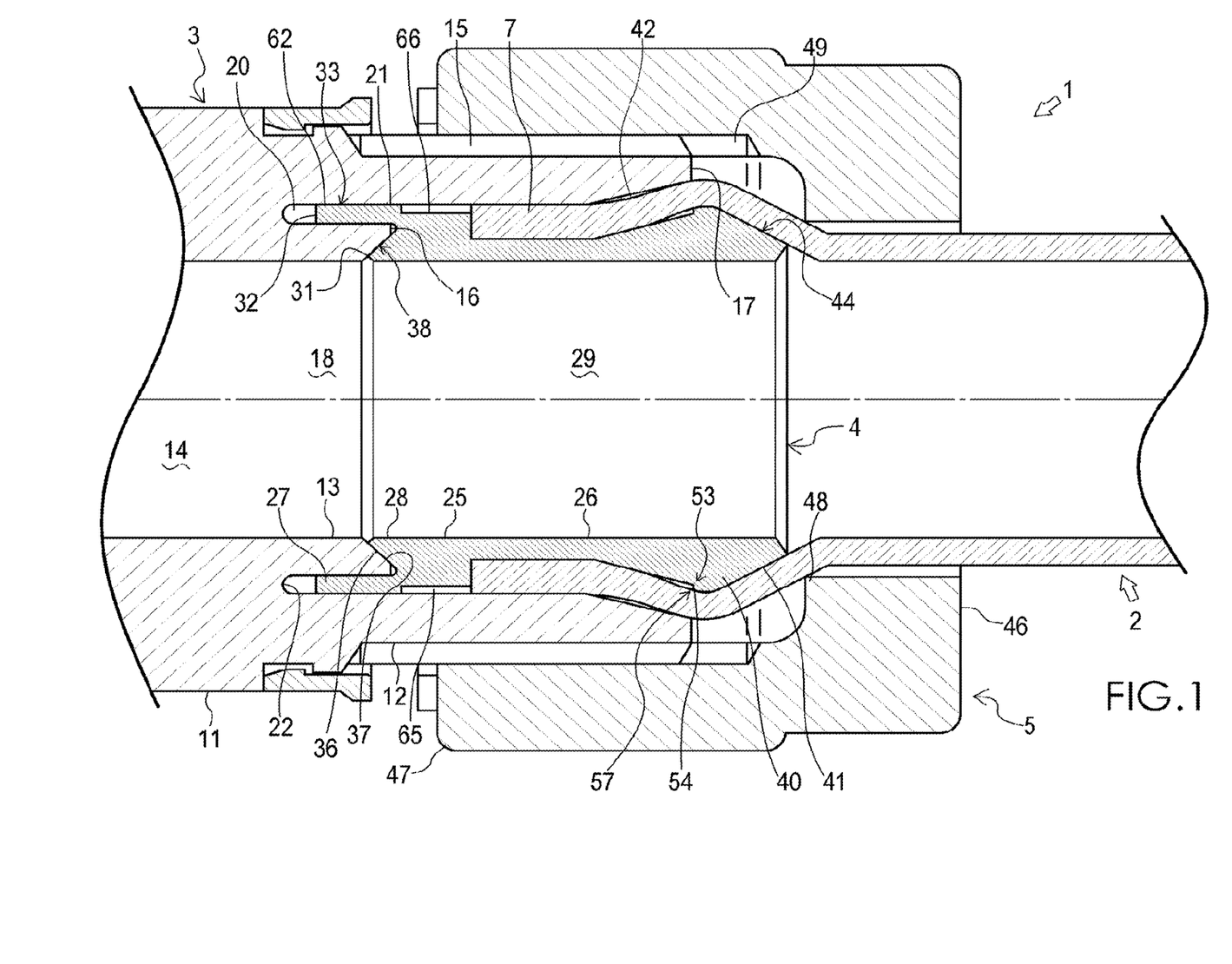
FIG. 1 is a sectional view of a structure of a resin-made pipe joint of an embodiment of the invention.
Figure 2:
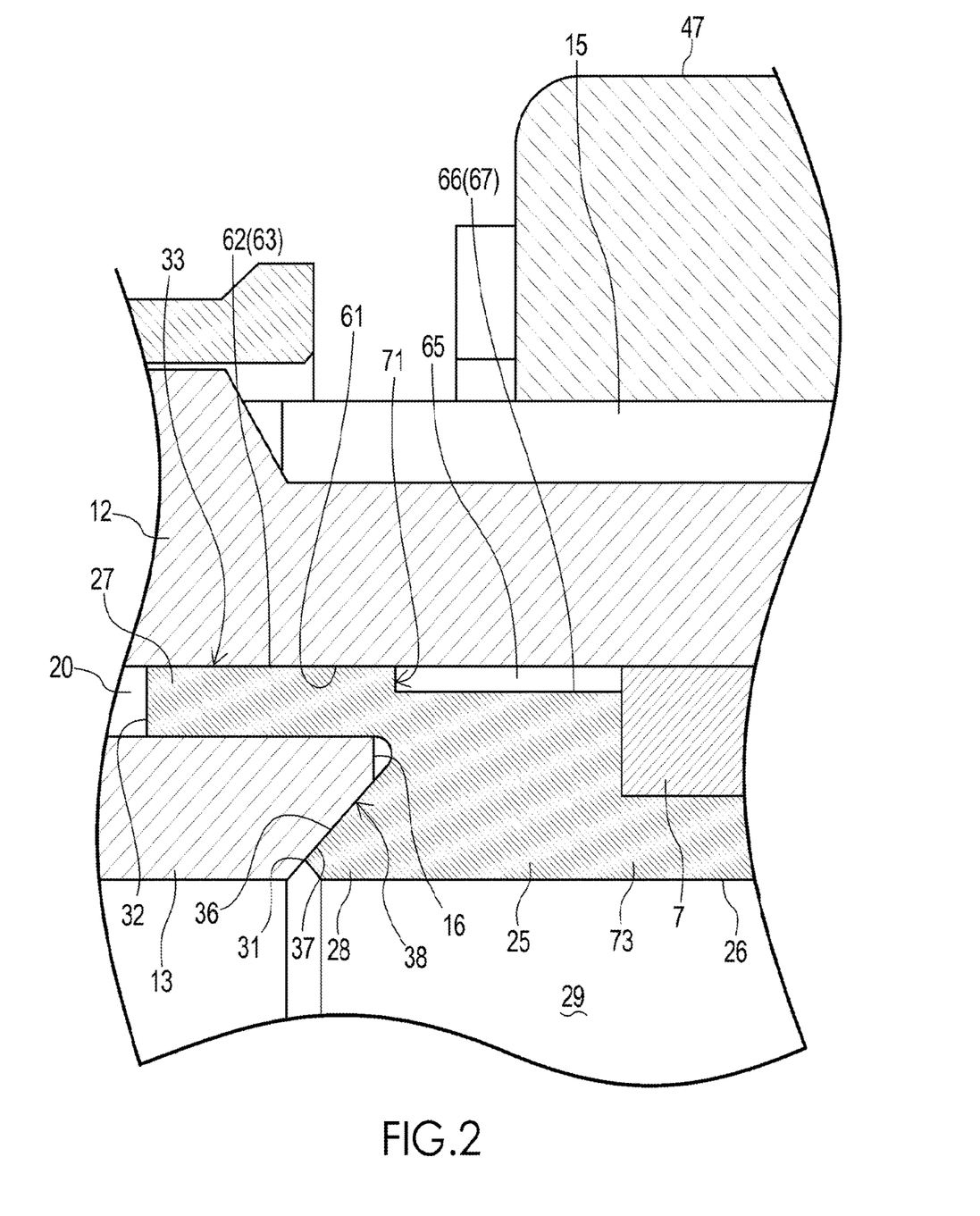
FIG. 2 is a partial enlarged view of FIG. 1.

FIG. 1 is a sectional view of the structure 1 of a resin-made pipe joint. FIG. 2 is a partial enlarged view of FIG. 1. FIG. 1 shows a state where a tube 2 is coupled to the structure 1 of a resin-made pipe joint.

As shown in FIG. 1, the structure 1 of a resin-made pipe joint comprises a joint body 3, a sleeve 4, and a fastening member 5. The structure 1 of a resin-made pipe joint is produced by using a synthetic resin such as a fluorine resin. The tube 2 is flexible, and, in the embodiment, produced by using a synthetic resin such as a fluorine resin.

The joint body 3 has a cylindrical shape. The joint body 3 comprises a body cylinder portion 11, an outer cylinder portion 12, and an inner cylinder portion 13. In the embodiment, the joint body 3 is made of a fluorine resin, and specifically molded by using PFA (perfluoroalkoxy alkane) or PTFE (polytetrafluoroethylene).

The body cylinder portion 11 can be coupled to the sleeve 4, and has a flow path 14 for a fluid in the body cylinder portion 11. In the embodiment, the body cylinder portion 11 is formed into a cylindrical shape. The flow path 14 is disposed so as to have an approximately circular sectional surface, and extend inside the body cylinder portion 11 in the axial direction of the body cylinder portion, in order to enable the flow path to be communicatable with the interior of the tube 2.

The outer cylinder portion 12 is coaxially projected from one axial end portion of the body cylinder portion 11 in one axial direction thereof so as to be screwable with the fastening member 5. In the embodiment, the outer cylinder portion 12 is formed into a cylindrical shape. An external thread 15 which is a screwing portion is disposed in the axial direction of the outer cylinder portion 12 on the outer circumferential surface of the outer cylinder portion 12.

The inner cylinder portion 13 is placed radially inside the outer cylinder portion 12. The inner cylinder portion 13 is coaxially projected from the one axial end of the body cylinder portion 11 in the same direction as the outer cylinder portion 12 so that a projection end 16 of the inner cylinder portion is located on the side of the body cylinder portion 11 with respect to a projection end 17 of the outer cylinder portion 12.

In the embodiment, the inner cylinder portion 13 is formed into a cylindrical shape which has an inner diameter that is substantially equal to that of the body cylinder portion 11, and which has an outer diameter that is smaller than the inner diameter of the outer cylinder portion 12. A flow path 18 is disposed so as to have an approximately circular sectional shape, and extend inside the inner cylinder portion 13 in the axial direction of the portion, and continuous to the flow path 14.

A groove portion 20 which is surrounded by the body cylinder portion 11, the outer cylinder portion 12, and the inner cylinder portion 13 is disposed in the joint body 3. The groove portion 20 is formed into an annular shape which extends over the whole outer circumferential surface of the inner cylinder portion 13 so that another axial end portion (a press-inserting portion 27 which will be described later) of the sleeve 4 can be press-inserted into the groove portion.

In the embodiment, the groove portion 20 is disposed between the inner cylinder portion 13 and the other axial side of the outer cylinder portion 12 which is opposed to the inner cylinder portion. The groove portion 20 has an opening 21 in the vicinity of the projection end 16 of the inner cylinder portion 13, and a closed portion 22 which is formed into a concavely arcuate shape in a section (see FIG. 1) containing the axis of the joint body 3, on the side of the body cylinder portion 11.

The sleeve 4 comprises a coupling portion 26 and the press-inserting portion 27. The sleeve 4 is configured so that the tube 2 can be connected to the joint body 3 by press-inserting the coupling portion 26 into the tube 2, and, in the press-inserted state, press-inserting the press-inserting portion 27 into the joint body 3.

In the embodiment, the sleeve 4 comprises an inserting portion 25 and a restricting portion 28 in addition to the coupling portion 26 and the press-inserting portion 27. A flow path 29 which is connectable to the flow path 18, and which has an approximately circular section is disposed inside the sleeve 4. In the embodiment, the sleeve 4 is made of a fluorine resin, and specifically molded by using PFA or the like.

The inserting portion 25 has a cylindrical shape, and is configured so as to be insertable into the outer cylinder portion 12 of the joint body 3. In the embodiment, the inserting portion 25 is formed into a cylindrical shape which has an outer diameter that is larger than the inner diameter of the tube 2, and which has an inner diameter that is substantially equal to the inner diameters of the inner cylinder portion 13 of the joint body 3 and the tube 2.

The coupling portion 26 is formed into a cylindrical shape, configured so as to be coaxially projected from the inserting portion 25 in one axial direction, and coaxially press-insertable into the one longitudinal end portion 7 of the tube 2. In the embodiment, the coupling portion 26 is formed into a cylindrical shape which has an inner diameter that is substantially equal to the inner diameters of the inserting portion 25 and the tube 2.

The outer diameter of the coupling portion 26 is set to be smaller than the outer diameter of the inserting portion 25, and larger than the inner diameter of the tube 2. When the coupling portion 26 is press-inserted into the one longitudinal end portion 7 of the tube 2, therefore, the one longitudinal end portion 7 of the tube 2 can be located by the inserting portion 25 while the one longitudinal end portion is flared by the coupling portion 26.

The press-inserting portion 27 is a cylindrical portion, and configured so as to be coaxially projected from the inserting portion 25 in the other axial direction to be press-insertable into the groove portion 20 through the opening portion 21. In the embodiment, the press-inserting portion 27 is formed into a cylindrical shape which has an inner diameter that is larger than that of the inserting portion 25.

The radial width of the press-inserting portion 27 is set to be larger than the groove width (radial width) of the groove portion 20 so that the press-inserting portion 27 can be press-inserted into the groove portion 20. In the embodiment, the outer diameter of the press-inserting portion 27 is set to have a dimension which is slightly larger than or substantially equal to the inner diameter of the outer cylinder portion 12, and the inner diameter of the press-inserting portion 27 is set to be smaller than the outer diameter of the inner cylinder portion 13.

The restricting portion 28 is formed into a cylindrical shape, and placed on the radially inner side of the sleeve 4 with respect to the press-inserting portion 27. The restricting portion 28 is coaxially projected from the inserting portion 25 in the same direction as the press-inserting portion 27 so that the projection end 31 is located on the side of the inserting portion 25 with respect to the projection end 32 of the press-inserting portion 27.

The restricting portion 28 is configured so as to, in the press-insertion of the press-inserting portion 27 into the groove portion 20 of the joint body 3 from the opening portion 21 toward the closed portion 22, be located radially inside the inner cylinder portion 13 to restrict deformational movement of the inner cylinder portion 13 toward the radially inner side (toward the flow path 18), the inner cylinder portion being pushed by the press-inserting portion 27.

In the embodiment, the restricting portion 28 is formed into a cylindrical shape which has an inner diameter that is substantially equal to that of the inserting portion 25. The outer diameter of the restricting portion is set to be smaller than the inner diameter of the press-inserting portion 27, so as to be able to clamp the side of the projection end 16 of the inner cylinder portion 13 between the restricting portion 28 and one axial direction side of the press-inserting portion 27 which are opposed to each other.

When the press-inserting portion 27 is press-inserted into the groove portion 20, therefore, the restricting portion 28 can support the inner cylinder portion 13 which is caused by the pushing of the press-inserting portion 27 to try to deform and move from the side of the projection end 16 toward the radially inner side with respect to the body cylinder portion 11, in the side of the projection end 16, whereby the deformational movement of the inner cylinder portion 13 to the radially inner side can be restricted.

In this way, a first sealing portion 33 which seals between the outer circumferential surface 63 of the press-inserting portion 27 and the inner circumferential surface 61 of the outer cylinder portion 12, and seals between the inner circumferential surface of the press-inserting portion 27 and the outer circumferential surface of the inner cylinder portion 13 is formed by press-inserting the press-inserting portion 27 into the groove portion 20 in the state where the deformational movement of the inner cylinder portion 13 is restricted by the restricting portion 28.

In the embodiment, moreover, the restricting portion 28 is formed into a tapered shape in which the outer diameter of the restricting portion is gradually reduced as further advancing from one axial side toward the other side (the side of the projection end 31). Then, the outer circumferential surface 36 of the restricting portion 28 is formed into a taper-like shape which is buttable against a tapered surface 37 that is disposed in the vicinity of the projection end 16 of the inner cylinder portion 13.

When the press-inserting portion 27 is press-inserted into the groove portion 20, therefore, the taper-like outer circumferential surface 36 of the restricting portion 28, and the tapered surface 37 of the inner cylinder portion 13 are press-contacted with each other, and a second sealing portion 38 which seals between the taper-like outer circumferential surface 36 of the restricting portion 28, and the tapered surface 37 of the inner cylinder portion 13 is formed.

The sleeve 4 further comprises an expanding portion 40. The sleeve 4 is configured so as to be press-inserted from the one axial side of the sleeve 4 into the one longitudinal end portion 7 of the tube 2 to flare the one longitudinal end portion 7, and hold the flared state by using the expanding portion 40.

The expanding portion 40 is placed on the one axial side of the sleeve 4, and formed into an annular shape so as to expand radially outward from the coupling portion 26. The expanding portion 40 has a tapered surface 41 which is flared as further advancing from one axial side toward the other side, in order to flare the one longitudinal end portion 7 of the tube 2.

When the sleeve 4 is press-inserted into the one longitudinal end portion 7 of the tube 2, therefore, the tapered surface 41 of the sleeve 4 is in surface contact in the press contact state with the inner circumferential surface of the taper-like part of the one longitudinal end portion 7 of the tube 2, and a third sealing portion 44 which seals between the tapered surface 41 and the one longitudinal end portion 7 of the tube 2 is formed.

The expanding portion 40 further has an annular step portion 53. The step portion 53 is placed in the side which is opposite to the tapered surface 41 across the apex of the expanding portion 40 in the axial direction of the sleeve 4. In the step portion 53, an edge portion 54 which is contacted with a part of the inner circumferential surface of the tube 2 when the sleeve 4 is press-inserted into the one longitudinal end portion 7 of the tube 2 is disposed.

When the sleeve 4 is press-inserted into the one longitudinal end portion 7 of the tube 2, therefore, the edge portion 54 of the step portion 53 is contacted in the press contact state with a part of the inner circumferential surface of the one longitudinal end portion 7 of the tube 2, to form a fourth sealing portion 57 for sealing between the edge portion 54 and the one longitudinal end portion 7 of the tube 2.

The fastening member 5 fixes the tube 2 in the state where the coupling portion 26 of the sleeve 4 is press-inserted, to the joint body 3 through the sleeve 4. Namely, the fastening member holds the connection state between the joint body 3 and the tube 2. In the embodiment, the fastening member 5 is configured by a union nut so as to be loosely fittable to the tube 2.

Specifically, the fastening member 5 comprises a pressing portion 46 and an outer ring portion 47. In the embodiment, the fastening member 5 is made of a fluorine resin, and specifically molded by using, for example, PFA.

The pressing portion 46 is cylindrical, and configured so as to be fittable onto the tube 2 in a manner that the portion is relatively movable in the longitudinal direction of the tube. In the embodiment, the pressing portion 46 is formed into a cylindrical shape having an inner diameter which is slightly larger than the outer diameter of the tube 2. An edge portion 48 is disposed on the inner diameter side in another axial end portion of the pressing portion 46.

The outer ring portion 47 is configured so as to be screwable to the outer cylinder portion 12 of the joint body 3 from the radially outer side. In the embodiment, the outer ring portion 47 is formed into a cylindrical shape having an inner diameter which is larger than that of the pressing portion 46. The outer ring portion 47 is coaxially projected in the other axial direction from the outer diameter side in the other axial end portion of the pressing portion 46.

The inner diameter of the outer ring portion 47 is set to be substantially equal to the outer diameter of the outer cylinder portion 12 in order to be able to surround the outer cylinder portion 12. An internal thread 49 corresponding to the external thread 15 of the outer cylinder portion 12 is disposed on the inner circumferential surface of the outer ring portion 47 along the axial direction of the outer ring portion 47. This enables the outer ring portion 47 to be screwable with the outer cylinder portion 12.

Then, the pressing portion 46 has a configuration where the edge portion 48 presses the sleeve 4 through the taper-like part of the one longitudinal end portion 7 of the tube 2 so that the press-inserting portion 27 is press-inserted into the groove portion 20 by fastening the fastening member 5 in the state where the outer ring portion 47 is screwed with the outer cylinder portion 12.

In the case where the fastening of the fastening member 5 is performed, therefore, a part of the one longitudinal end portion 7 of the tube 2 which is inserted together with the sleeve 4 into the outer cylinder portion is held in a state where the part is pressed against the tapered surface 41. Consequently, it is possible to prevent the tube 2 from slipping off, and enhance the sealing property in the third sealing portion 44.

In the thus configured structure 1 of a resin-made pipe joint, when the tube 2 is to be coupled to the joint, first, the coupling portion 26 and the expanding portion 40 are press-inserted into the one longitudinal end portion 7 of the tube 2 so that the sleeve 4 is coupled to the tube 2. Then, the sleeve 4 is inserted from the press-inserting portion 27 into the outer cylinder portion 12.

After the insertion of the sleeve 4, the fastening member 5 is fastened to the outer cylinder portion 12 to press-insert the press-inserting portion 27 into the groove portion 20, and the restricting portion 28 is press-contacted with the inner cylinder portion 13. Moreover, the edge portion 48 is pressed against the part of the one longitudinal end portion 7 of the tube 2, and the state where the part is pressed against the sleeve 4 is maintained.

As a result, the tube 2 can be coupled to the structure 1 of a resin-made pipe joint while the first sealing portion 33 in which the sealing force radially acts, and the second sealing portion 38 in which the sealing force axially acts are formed between the joint body 3 and the sleeve 4, and the third sealing portion 44 and the fourth sealing portion 57 are formed between the tube 2 and the sleeve 4.

Next, the sleeve 4 will be described in more detail with reference to the drawings.

Figure 3:
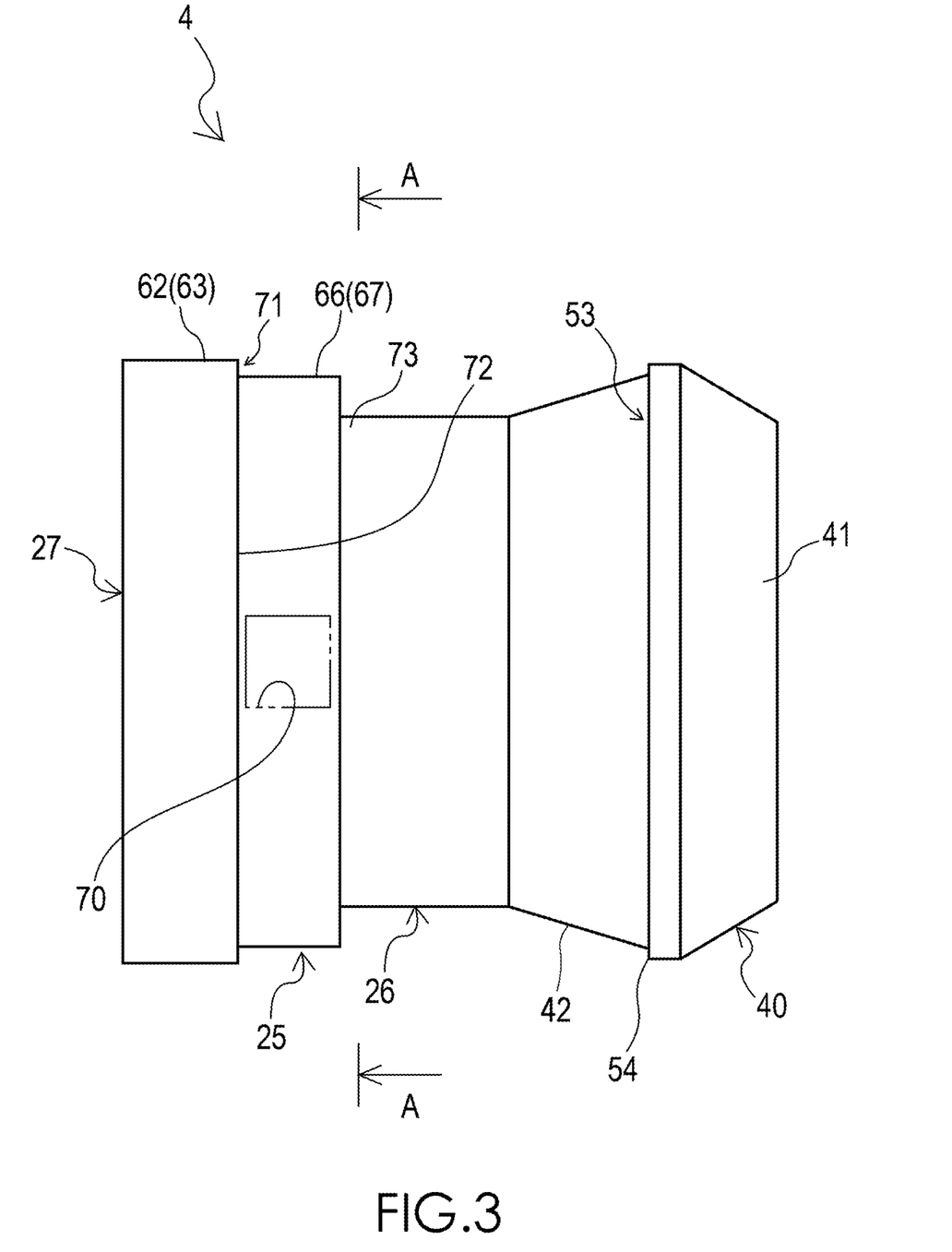
FIG. 3 is a plan view of a sleeve in the structure of a resin-made pipe joint of FIG. 1.
Figure 4:
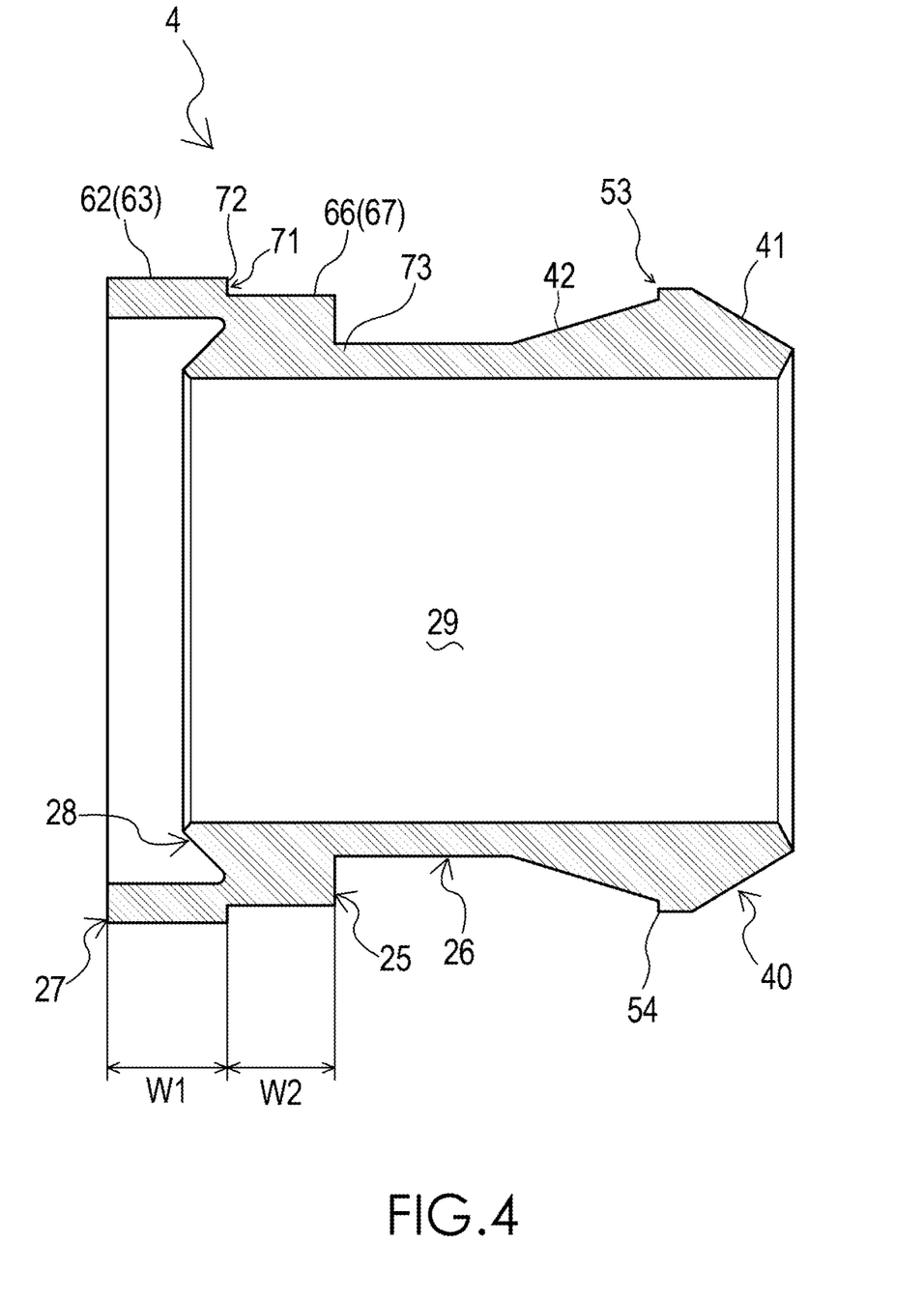
FIG. 4 is a sectional view of the sleeve of FIG. 3.
Figure 5:
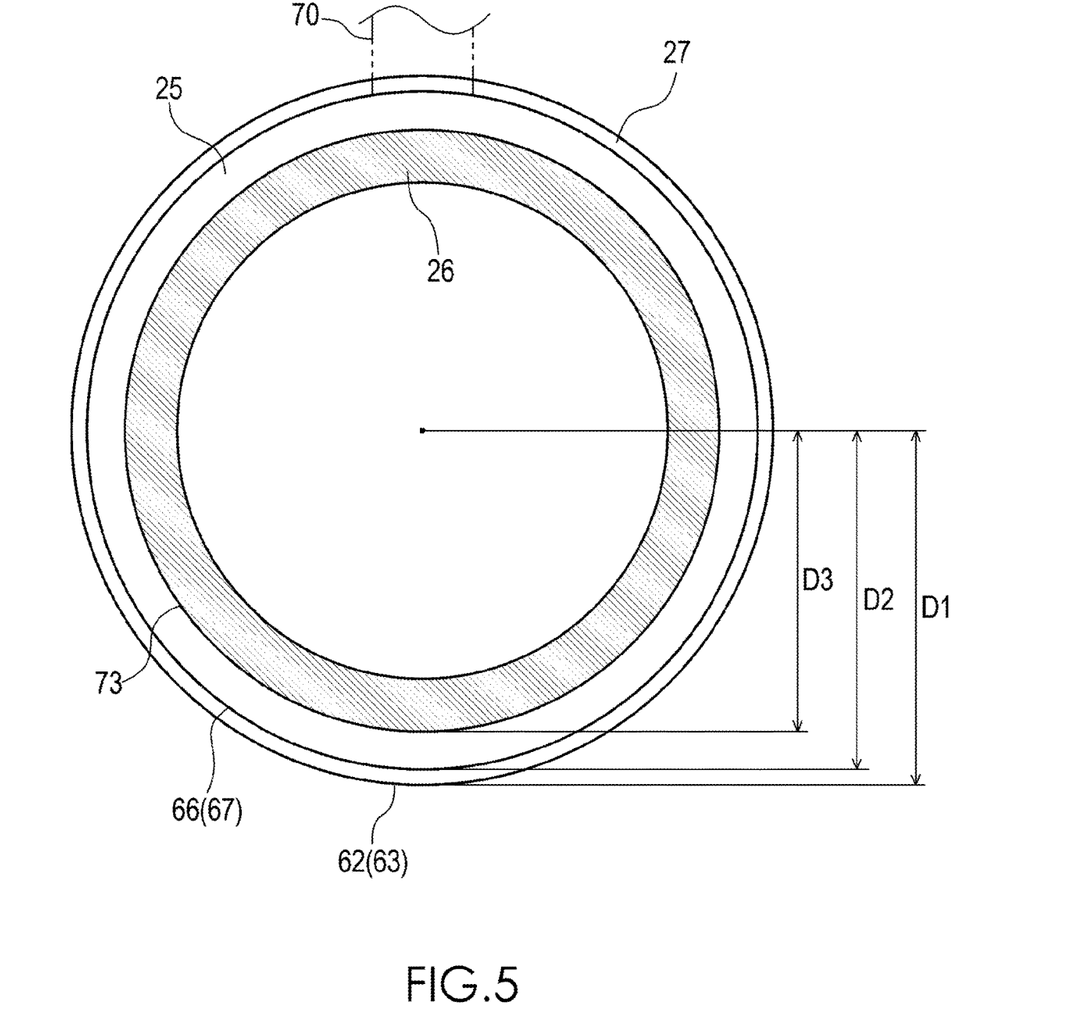
FIG. 5 is a partial rear sectional view of the sleeve of FIG. 3.

FIG. 3 is a plan view of the sleeve 4. FIG. 4 is a sectional view containing the axis of the sleeve 4. FIG. 5 is a partial rear sectional view of the sleeve 4 (a sectional view taken along A-A in FIG. 3).

As shown in FIGS. 2, 3, 4, and 5, the sleeve 4 contains a sealing surface 62 which is closely contactable with the inner circumferential surface 61 of the joint body 3, on the outer circumferential surface 63 of the press-inserting portion 27. Between the press-inserting portion 27 and the coupling portion 26, the sleeve 4 comprises a non-contacting surface 66 which can form a space 65 with respect to the inner circumferential surface 61 of the joint body 3.

In the embodiment, when the press-inserting portion 27 is press-inserted into the groove portion 20, the sealing surface 62 is closely contacted with the inner circumferential surface 61 of the joint body 3 (specifically, the outer cylinder portion 12) in order to form the first sealing portion 33. The sealing surface 62 is formed by a substantially whole of the outer circumferential surface 63 of the press-inserting portion 27 so as to have an annular shape which extends along the inner circumferential surface 61 of the joint body 3.

The non-contacting surface 66 is held to a state where, when the press-inserting portion 27 is press-inserted into the groove portion 20, the non-contacting surface is separated by a predetermined distance from the inner circumferential surface 61 of the outer cylinder portion 12 in the radial direction of the sleeve 4. The non-contacting surface 66 is formed by a substantially whole of the outer circumferential surface 67 of the inserting portion 25 so as to have an annular shape which extends along the inner circumferential surface 61 of the outer cylinder portion 12.

In the embodiment, the non-contacting surface 66 is placed radially inside the outer circumferential surface 63 of the press-inserting portion 27 (the outer diameter of the inserting portion 25 is set to be smaller than that of the press-inserting portion 27). In this way, when the sealing surface 62 is closely contacted with the inner circumferential surface 61 of the joint body 3, the space 65 is formed between the inner circumferential surface 61 of the joint body 3 and the non-contacting surface 66.

Here, a step portion 71 is disposed between the outer circumferential surface 63 (the sealing surface 62) of the press-inserting portion 27 and the non-contacting surface 66. The step portion 71 is formed so as to have an annular step surface 72 having a radial width which is substantially uniform over the whole circumference in the circumferential direction of the sleeve 4.

In the case where, as shown in FIG. 5, the outer diameter of the press-inserting portion 27 (the sealing surface 62) is defined as D1, that of the inserting portion (the non-contacting surface 66) is defined as D2, and that of another axial end portion 73 of the coupling portion 26 is defined as D3, D2/D1 is set to 0.7 or more and 0.99 or less, and D2 is set to be equal to or larger than D3.

In the sleeve 4, namely, the outer diameters of the other axial end portion 73 of the coupling portion 26, the inserting portion 25, and the press-inserting portion 27 are set to be increased in this order. As described above, the inserting portion 25 and the coupling portion 26 are coaxially placed, and formed so as to have a substantially equal inner diameter.

In the embodiment, in the case where, as shown in FIG. 4, the axial width of the sealing surface 62 is defined as W1, and that of the non-contacting surface 66 is defined as W2, W1/W1+W2 is set to 0.3 or more. Moreover, W2 is set to be equal to or larger than the axial width of a gate port 70 of molds for producing the sleeve 4.

The gate port 70 is disposed for, when the sleeve 4 is to be produced by using a predetermined resin and the molds, pouring the molten resin into a cavity formed by the molds. The gate port 70 is placed in a portion where, in the molds, the non-contacting surface 66 of the produced sleeve 4 is to be molded (see FIGS. 3 and 5).

The gate port 70 may be disposed in the outer circumferential surface of the coupling portion 26 or/and a tapered surface 42 of the expanding portion 40 which is continuous thereto, in place of the non-contacting surface 66 (the outer circumferential surface 67 of the inserting portion 25). Alternatively, the gate port may be disposed in the outer circumferential surface of the coupling portion 26 or/and the tapered surface 42 in addition to the non-contacting surface 66.

However, the tube 70 is fitted to the outer circumferential surface of the coupling portion 26 and the tapered surface 42. From the view point of the workability of attaching the sleeve 4 to the tube 2, therefore, the gate port 70 is preferably disposed only in the non-contacting surface 66.

According to the above-described configuration, in the structure 1 of a resin-made pipe joint in which the press-inserting portion 27 of the sleeve 4 is press-inserted into the joint body 3 (the outer cylinder portion 12) in order to form the first sealing portion 33, the sealing property of the first sealing portion 33 can be prevented from being lowered due to the production accuracy of the sleeve 4, without causing troubles such as polishing of the sealing surface 62 of the press-inserting portion 27 during production of the sleeve 4.

Namely, the sleeve 4 is produced by using a predetermined resin, the molds, and the like as described above. In production of the sleeve, as shown in, for example, FIG. 6, the gate port 70 is placed in one place of the area for molding the non-contacting surface 66 in a cavity 85 formed by molds 81, 82, 83, 84, and the molten resin is poured into the cavity 85 through the gate port 70. Therefore, the gate port 70 is not placed in a portion where the sealing surface 62 is to be molded, and hence a gate residue is not generated on the sealing surface 62.

When the molten resin is poured into the cavity 85 through the gate port 70, the resin basically undergoes a process in which the resin flows in the circumferential direction (the directions of the arrows X in FIG. 6) to form the non-contacting surface 66, and then flows in the axial direction (the directions of the arrows X in FIG. 7) to form the sealing surface 62 and the like. Therefore, a weld line is hardly generated on the molded sealing surface 62.

After the pouring of the molten resin is completed, moreover, as described above, a weld line is hardly generated on the sealing surface 62, and a gate residue is not generated on the sealing surface 62. During the work of producing the sleeve 4, therefore, it is not required to perform a step of polishing the sealing surface 62 in which the sealing property of the first sealing portion 33 is considered. In the production of the sleeve 4, as a result, the quality can be stabilized, and the production cost can be reduced.

Figure 6:
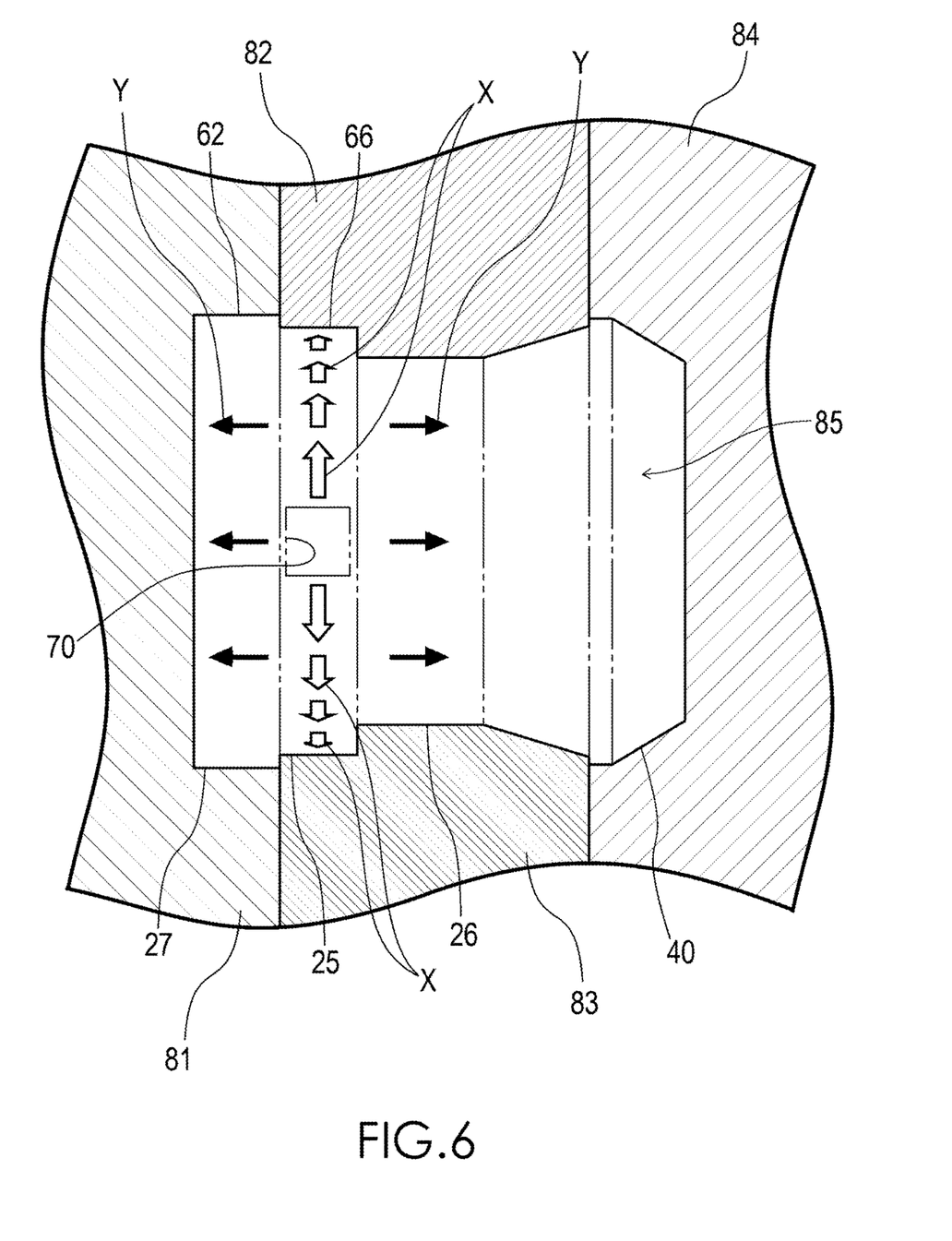
FIG. 6 is a sectional view showing a manner of production of the sleeve of FIG. 3.

In the case where production means such as shown in FIG. 6 is employed, the sleeve 4 can be produced by using the separate molds 81, 82, 83, 84 which are placed in consideration of the step portion 71, and therefore it is possible to prevent a parting line from being formed on the sealing surface 62.

Figure 7:
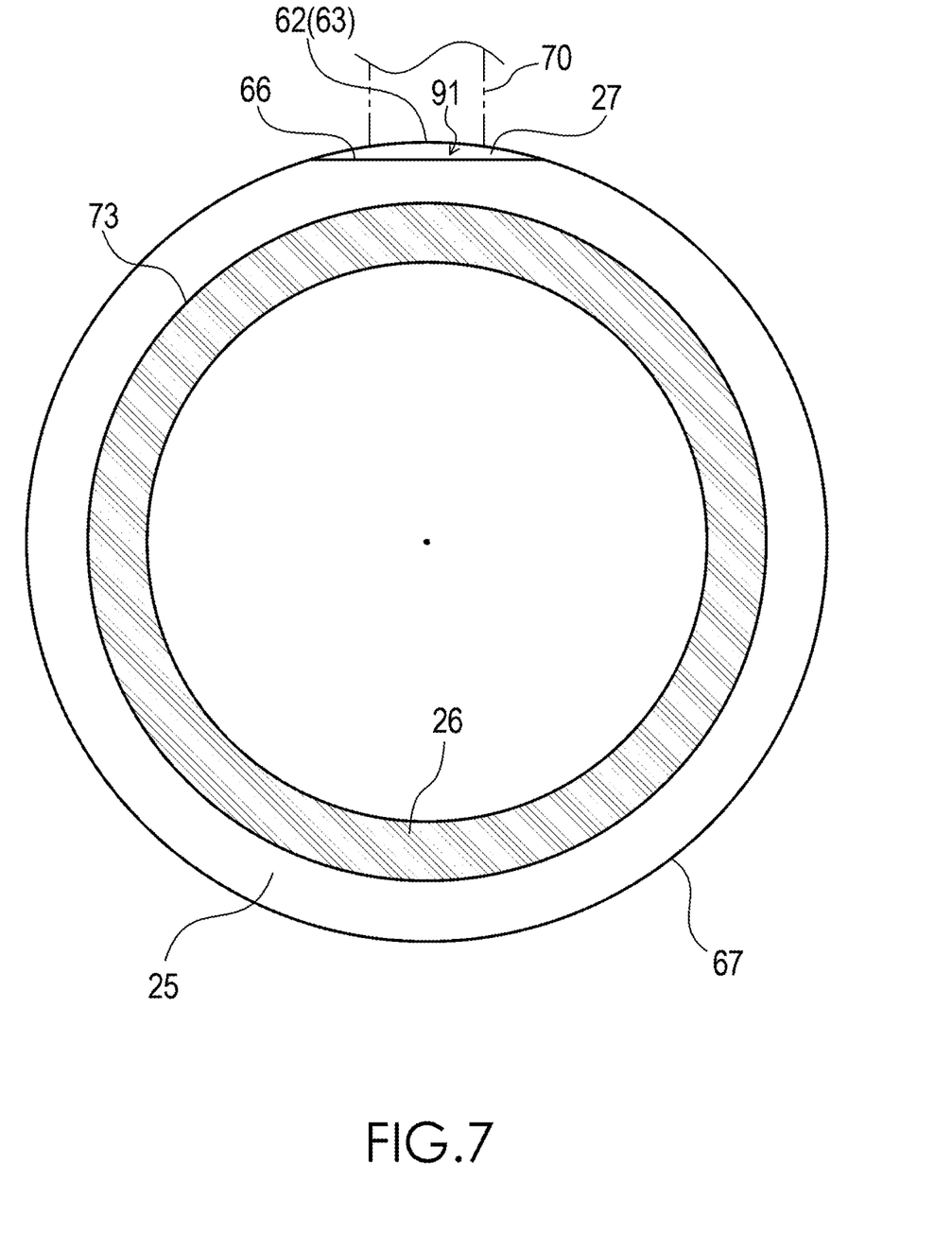
FIG. 7 is a partial rear sectional view of a sleeve of another example.

Although, in the embodiment, the non-contacting surface 66 of the sleeve 4 is an annular surface configured by the outer circumferential surface of the inserting portion 25 having an outer diameter which is smaller than the outer diameter of the press-inserting portion 27, the invention is not limited to this mode. As shown in FIG. 7, for example, the inserting portion 25 may have a cutaway 91 in the outer circumferential portion thereof, and the non-contacting surface 66 may be configured by a flat surface formed by a part (the inner surface of the cutaway 91) of the outer circumferential surface of the inserting portion 25.

DESCRIPTION OF REFERENCE NUMERALS 1 resin-made pipe joint
2 tube
3 joint body
4 sleeve
5 fastening member
11 body cylinder portion
12 outer cylinder portion
13 inner cylinder portion 20 groove portion
25 inserting portion
26 coupling portion
27 press-inserting portion
28 restricting portion
62 sealing surface
63 outer circumferential surface of press-inserting portion
65 space
66 non-contacting surface
71 step portion

The invention claimed is:

1. A structure of a resin-made pipe joint comprising:
a joint body having a cylindrical shape:
a sleeve having a cylindrical press-inserting portion which is press-insertable into the joint body, and a cylindrical coupling portion which is press-insertable into a tube; and
a fastening member for fixing the tube which is in a state where the coupling portion is press-inserted, to the joint body through the sleeve, wherein
the sleeve contains a sealing surface in an outer circumferential surface of the press-inserting portion, the sealing surface is closely contactable with an inner circumferential surface of the joint body, and
the sleeve comprises a non-contacting surface between the press-inserting portion and the coupling portion, the non-contacting surface and the inner circumferential surface of the joint body forms a space therebetween when the sealing surface is closely contacted with the inner circumferential surface of the joint body, and
when the axial width of the sealing surface is defined as W1 and that of the non-contacting surface is defined as W2, W1/(W1+W2) is set to 0.3 or more.

2. The structure of a resin-made pipe joint according to claim 1, wherein the sleeve has a step portion for locating the non-contacting surface radially inside an outer circumferential surface of the press-inserting portion, between the outer circumferential surface of the press-inserting portion and the non-contacting surface.

3. The structure of a resin-made pipe joint according to claim 1, wherein
the joint body has:
a body cylinder portion in which a flow path for a fluid is formed, the flow path being communicatable with an interior of the tube through the sleeve;
an outer cylinder portion which is coaxially projected from the body cylinder portion in an axial direction of the body cylinder portion so as to be screwable with the fastening member; and
an inner cylinder portion which is placed radially inside the outer cylinder portion, and which is coaxially projected from the body cylinder portion in a same direction as the outer cylinder portion so as to locate a projection end on a side of the body cylinder portion with respect to a projection end of the outer cylinder portion, and
is configured so that a groove portion which opens in one axial direction is formed while being surrounded by the body cylinder portion, the outer cylinder portion, and the inner cylinder portion, and
the sleeve has:
a cylindrical inserting portion which contains the non-contacting surface in the outer circumferential surface, which, between the press-inserting portion and the coupling portion, causes them to be coaxially projected, and which is inserted into the outer cylinder portion; and
a cylindrical restricting portion which is placed radially inside the press-inserting portion, and which is projected from the inserting portion so as to locate a projection end on a side of the inserting portion with respect to the projection end of the press-inserting portion,
the press-inserting portion being press-inserted into the groove portion, the restricting portion being configured to, during a process of press-inserting the press-inserting portion into the groove portion, be located radially inside the inner cylinder portion to restrict deformational movement of the inner cylinder portion toward the radially inner side, the inner cylinder portion being pushed by the press-inserting portion.

4. The structure of a resin-made pipe joint according to claim 2, wherein
the joint body has:
a body cylinder portion in which a flow path for a fluid is formed, the flow path being communicatable with an interior of the tube through the sleeve;
an outer cylinder portion which is coaxially projected from the body cylinder portion in an axial direction of the body cylinder portion so as to be screwable with the fastening member; and
an inner cylinder portion which is placed radially inside the outer cylinder portion, and which is coaxially projected from the body cylinder portion in a same direction as the outer cylinder portion so as to locate a projection end on a side of the body cylinder portion with respect to a projection end of the outer cylinder portion, and
is configured so that a groove portion which opens in one axial direction is formed while being surrounded by the body cylinder portion, the outer cylinder portion, and the inner cylinder portion, and
the sleeve has:
a cylindrical inserting portion which contains the non-contacting surface in the outer circumferential surface, which, between the press-inserting portion and the coupling portion, causes them to be coaxially projected, and which is inserted into the outer cylinder portion; and
a cylindrical restricting portion which is placed radially inside the press-inserting portion, and which is projected from the inserting portion so as to locate a projection end on a side of the inserting portion with respect to the projection end of the press-inserting portion,
the press-inserting portion being press-inserted into the groove portion, the restricting portion being configured to, during a process of press-inserting the press-inserting portion into the groove portion, be located radially inside the inner cylinder portion to restrict deformational movement of the inner cylinder portion toward the radially inner side, the inner cylinder portion being pushed by the press-inserting portion.

5. The structure of a resin-made pipe joint according to claim 1, wherein an outer diameter of the sealing surface is defined as D1, an outer diameter of the non-contacting surface is defined as D2, such that D2/D1 is set to 0.7 or more and 0.99 or less.

6. The structure of a resin-made pipe joint according to claim 5, wherein an outer diameter of an axial end portion of the coupling portion is defined as D3, such that D2 is set to be equal to or larger than D3.

* * * * *